United States Patent
Hooli et al.

(10) Patent No.: US 12,477,466 B2
(45) Date of Patent: Nov. 18, 2025

(54) WAKE-UP SIGNAL BEACON ARRANGEMENT FOR WAKE-UP SIGNAL COVERAGE DETECTION

(71) Applicant: NOKIA TECHNOLOGIES OY, Espoo (FI)

(72) Inventors: Kari Juhani Hooli, Oulu (FI); Knud Knudsen, Aabybro (DK); Jorma Johannes Kaikkonen, Oulu (FI); Mads Lauridsen, Gistrup (DK); Jussi-Pekka Koskinen, Oulu (FI); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 393 days.

(21) Appl. No.: 18/112,413

(22) Filed: Feb. 21, 2023

(65) Prior Publication Data

US 2024/0284334 A1  Aug. 22, 2024

(51) Int. Cl.
*H04W 52/02* (2009.01)
*H04W 24/02* (2009.01)

(52) U.S. Cl.
CPC ....... *H04W 52/0235* (2013.01); *H04W 24/02* (2013.01); *H04W 52/0216* (2013.01); *H04W 52/0219* (2013.01); *H04W 52/0229* (2013.01); *H04W 52/028* (2013.01)

(58) Field of Classification Search
CPC ......... H04W 52/0235; H04W 52/0219; H04W 52/0229; H04W 52/028; H04W 52/0216; H04W 24/02; Y02D 30/70
See application file for complete search history.

(56) References Cited

U.S. PATENT DOCUMENTS

| 11,470,553 B2 | 10/2022 | Haque et al. |
| 2020/0187120 A1 | 6/2020 | Alanen et al. |
| 2021/0274443 A1 | 9/2021 | Yang et al. |

(Continued)

FOREIGN PATENT DOCUMENTS

WO  2022/017298 A1  1/2022

OTHER PUBLICATIONS

Vivo et al., "Motivation for new study item on ultra-low power wake up signal in Rel-18", 3GPP TSG RAN rel-18 workshop, RWS-210168, Jun. 2021.

(Continued)

*Primary Examiner* — Omer S Mian
(74) *Attorney, Agent, or Firm* — Carter, DeLuca & Farrell LLP

(57) ABSTRACT

Wake-up signal beacon arrangement for wake-up signal coverage detection is provided. A method for wake-up signal beacon arrangement for wake-up signal coverage detection may include receiving at least one configuration for a first wake-up signal beacon and a second wake-up signal beacon. A power or energy of the second wake-up signal beacon may be lower than a power or energy of the first wake-up signal beacon. The method may also include monitoring a current cell for wake-up signal beacons during a wake-up signal mode using the received at least one configuration, and modifying the monitoring of the current cell based on a detection metric. The detection metric may be determined based on at least the second wake-up signal beacon.

1 Claim, 13 Drawing Sheets

(56) References Cited

U.S. PATENT DOCUMENTS

2022/0232476 A1* 7/2022 Reial ............... H04W 24/10
2024/0397422 A1* 11/2024 Martin ............. H04W 52/0235

OTHER PUBLICATIONS

Der-Jiunn Deng et al., "IEEE 802.11ba Wake-Up Radio: Performance Evaluation and Practical Designs", IEEE Access, vol. 8, Aug. 2020.
3rd Generation Partnership Project; Technical Specification Group Radio Access Network; NR; Physical channels and modulation (Release 17), 3GPP TS 38.211, V17.4.0, Dec. 2022.
3rd Generation Partnership Project; Technical Specification Group Radio Access Network; NR; Physical layer procedures for control (Release 17), 3GPP TS 38.213, V17.4.0, Dec. 2022.
3rd Generation Partnership Project; Technical Specification Group Radio Access Network; NR; Radio Resource Control (RRC) protocol specification (Release 17), 3GPP TS 38.331, V17.3.0, Dec. 2022.
3rd Generation Partnership Project; Technical Specification Group Radio Access Network; Study on support of reduced capability NR devices (Release 17), 3GPP TR 38.875, V17.0.0, Mar. 2021.
Extended European Search Report dated Jul. 31, 2024 issued in corresponding European Patent Application No. 24154303.2.
Nokia et al., "L1 signal design and procedure for low power WUS", 3GPP Draft; R1-2208700, 3rd Generation Partnership Project (3GPP), 3GPP TSG-WG1 Meeting #110-bis-e, e-Meeting, Sep. 30, 2022.

* cited by examiner

|  | Moody ISSCC'18 | | Jiang ISSCC'17[1] | Roberts ISSCC'16[2] | Sadagopan RFIC'17[3] | Salazar ISSCC'15 | Abe VLSI'14 | Pletcher ISSCC'08 |
|---|---|---|---|---|---|---|---|---|
| Technology | 130 nm | | 180 nm | 65 nm | 65 nm | 65 nm | 65 nm | 90 nm |
| Carrier Frequency | 151.8MHz | 433MHz | 113.5MHz | 2.4GHz | 2.4GHz | 2.4GHz | 925.4MHz | 2 GHz |
| Power Consumption | 7.4 nW | 7.4 nW | 4.5 nW | 236 nW | 365 nW | 99 μW | 45.5 μW | 52 μW |
| Data Rate | 200 bps | 200 bps | 300 bps | 8.192 kbps | 2.5 kbps | 10 kbps | 50 kbps | 100 kbps |
| Dissipated Energy per bit | 37 pJ | 37 pJ | 15 pJ | 28.8 pJ | 146 pJ | 9900 pJ | 910 pJ | 520 pJ |
| Non-constant Envelope Interferer Rejection | Integrated Auto Offset Control Loop | | N/A | N/A | N/A | N/A | 2-Step Wakeup | N/A |
| Out-of-band Interferer Rejection Method | High-Q FE Transformer | | High-Q FE Transformer | Matching Network | High-Q FE Co-Design | N-path filter | 2-Step Wakeup | MEMS Filter |
| Sensitivity | -76 dBm1 | -71 dBm1 | -69 dBm1 | -56.5 dBm2 | -61.5 dBm2 | -97 dBm2 | -87 dBm2 | -72 dBm2 |
| Sensitivity with Interference | -76 dBm2 | N/A | N/A | N/A | -58.5 dBm4 | -94 dBm5 | -84 dBm6 | N/A |
| Die Area | 1.95 mm2 | | 6 mm2 | 2.25 mm2* | 1.1 mm2* | 0.0576 mm2* | 1.27 mm2* | 0.1 mm2* |

Power consumption: nw, uw level

Sensitivity: low to -97 dBm

FIG. 3

WAKE-UP SIGNAL BEACON ARRANGEMENT FOR WAKE-UP SIGNAL COVERAGE DETECTION

TECHNICAL FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to wake-up signal beacon arrangement for wake-up signal coverage detection.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology, 5G Advanced radio access technology, or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Various exemplary embodiments may provide an apparatus including at least one processor and at least one memory storing instructions. The stored instructions, when executed by the at least one processor, cause the apparatus at least to receive at least one configuration for a first wake-up signal beacon and a second wake-up signal beacon. A power or energy of the second wake-up signal beacon may be lower than a power or energy of the first wake-up signal beacon. The apparatus may be further caused to monitor a current cell for wake-up signal beacons during a wake-up signal mode using the received at least one configuration, and modify the monitoring of the current cell based on a detection metric, wherein the detection metric is determined based on at least the second wake-up signal beacon.

Certain exemplary embodiments may provide an apparatus including at least one processor and at least one memory storing instructions. The stored instructions, when executed by the at least one processor, cause the apparatus at least to configure and transmit, to a user equipment, a wake-up signal mode configuration in which the user equipment is configured to operate, which includes at least one detection metric related to a second wake-up signal beacon and at least one threshold for comparison with the detection metric. The apparatus may be further caused to transmit, to the user equipment, one or more first wake-up signal beacons and one or more second wake-up signal beacons, wherein a power or energy of the second wake-up signal beacon is lower than a power or energy of the first wake-up signal beacon.

Some exemplary embodiments may provide a method including receiving at least one configuration for a first wake-up signal beacon and a second wake-up signal beacon, wherein a power or energy of the second wake-up signal beacon is lower than a power or energy of the first wake-up signal beacon. The method may further include monitoring a current cell for wake-up signal beacons during a wake-up signal mode using the received at least one configuration, and modifying the monitoring of the current cell based on a detection metric, wherein the detection metric is determined based on at least the second wake-up signal beacon.

Various exemplary embodiments may provide a method including configuring and transmitting, to a user equipment, a wake-up signal mode configuration in which the user equipment is configured to operate, which includes at least one detection metric related to a second wake-up signal beacon and at least one threshold for comparison with the detection metric. The method may also include transmitting, to the user equipment, one or more first wake-up signal beacons and one or more second wake-up signal beacons, wherein a power or energy of the second wake-up signal beacon is lower than a power or energy of the first wake-up signal beacon.

BRIEF DESCRIPTION OF THE DRAWINGS

For proper understanding of example embodiments, reference should be made to the accompanying drawings, as follows:

FIG. 3 illustrates an example of a table of characteristics of the exemplary wake-up receiver shown in FIG. 2;

DETAILED DESCRIPTION

It will be readily understood that the components of certain example embodiments, as generally described and illustrated in the figures herein, may be arranged and designed in a wide variety of different configurations. The following is a detailed description of some exemplary embodiments of systems, methods, apparatuses, and non-transitory computer program products for wake-up signal (WUS) beacon arrangement for WUS coverage detection. Although the devices discussed below and shown in the figures refer to 5G or Next Generation NodeB (gNB) devices and user equipment (UE), this disclosure is not limited to only gNBs and UEs. For example, the following description may also apply to any type of network access node or entity and UE or mobile device.

Additionally, if desired, the different functions or procedures discussed herein may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

In 5G/NR technology, a UE may enter an idle state, such as a sleep mode or deep sleep mode, in order to reduce power consumption with active communications that are not necessary or desired. In idle mode, the UE reduces power consumption and improves battery life. A paging signal may be transmitted to the UE, for example, over the physical downlink shared channel (PDSCH) that "wakes up" the UE from an idle state so that the UE can prepare to receive data.

Power consumption may depend on a length of a wake-up period, such as a paging cycle. To meet battery life requirements, an extended discontinuous reception (eDRX) cycle with a large value may be used, resulting in high latency, which may not be suitable for services with requirements of both long battery life and low latency. A UE may need to periodically wake up once per DRX cycle, which may significantly increase power consumption in periods with no signaling or data traffic. If the UE may instead wake up when triggered, e.g., paging, then power consumption may be reduced. The WUS may be used to trigger a main radio and a separate receiver which has the ability to monitor WUS with ultra-low power consumption. Main radio may work for data transmission and reception, which can be turned off or set to deep sleep unless turned on. The use of wake-up receivers (WUR) and WUS may reduce UE power consumption and latency.

Figure 1:
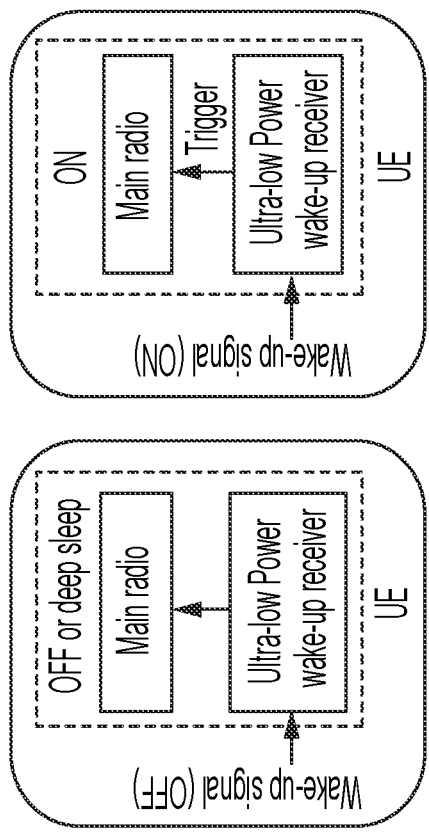
FIG. 1 illustrates an example of a user equipment (UE) in a sleep state transitioned to an active state by receiving a wake-up signal (WUS)

A separate low-power WUR may be used to save on UE power consumption when the UE's regular NR transceiver is in a deep sleep or a power-off state. FIG. 1 illustrates an example of a UE in a sleep or deep sleep state, which is transitioned to an active state by receiving a WUS. As shown in FIG. 1, a separate WUR may monitor for paging signals or WUS and the NR transceiver is turned on by the WUR when it receives the WUS from the network. Once the NR transceiver is turned on, the UE may start or restart normal communication functions with the network, such as a gNB.

Figure 2:
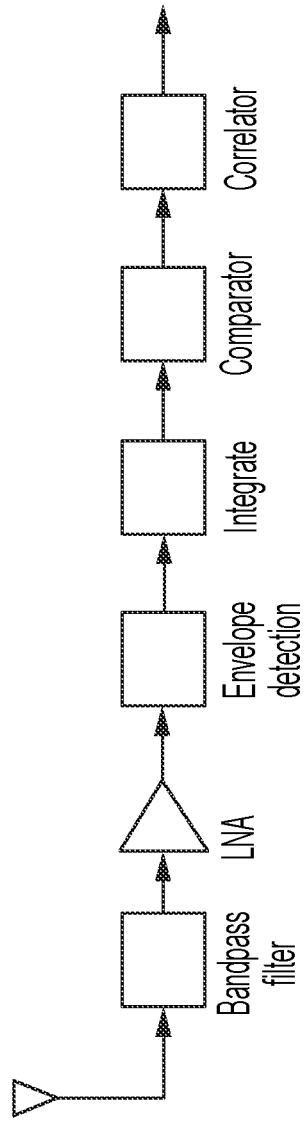
FIG. 2 illustrates an example of a structure of a separate wake-up receiver (WUR)

FIG. 2 illustrates an example of a structure of a separate WUR which may be implemented to obtain power saving due to a lower power consumption than a regular NR receiver. The WUR may include a bandpass filter, a low noise amplifier (LNA), enveloper detection module, integration module, comparator module, and correlator module. However, a WUR is not limited to the WUR illustrated in FIG. 2, which is used for exemplary purposes. FIG. 3 illustrates a table of characteristics of the WUR shown in FIG. 2. For example, a radio frequency (RF) sensitivity of the WUR may directly impact the coverage. The RF sensitivity of the WUR may be in range of −60 dBm to −97 dBm. An NR receiver may have an RF sensitivity of approximately −100 dBm. A lower power consumption may be correlated with a reduced/worse RF sensitivity and coverage.

Figure 4:
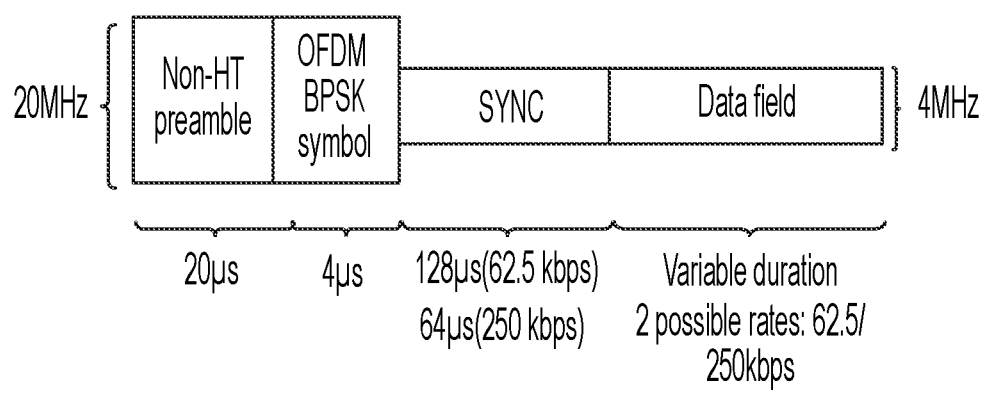
FIG. 4 illustrates an example of a WUR physical layer protocol data unit.

FIG. 4 illustrates an example of a WUR PHY protocol data unit (PPDU). In a PHY layer of the WUR, a 20 MHz non-high throughput (non-HT) preamble may be followed by a 20 MHz orthogonal frequency division multiplexing (OFDM) symbol with binary phase shift keying (BPSK) modulation of 4 μs duration, a synchronization (SYNC), and data fields. The non-HT preamble may allow WUR frame transmissions to be detected by a legacy IEEE 802.11a/g/n/ac station, as the 20 MHz non-HT preamble and the BPSK OFDM symbol combined may result in a 20 MHZ WUR PPDU preamble. The remaining part of WUR PPDCU, SYNC and data fields may be narrowband, as the number of OFDM subcarriers employed may be reduced to 13 subcarriers spaced 312.5 kHz each, i.e., SYNC and data fields may occupy 4 MHz of bandwidth instead of 20 MHz. This may allow for a simpler, lower power receiver to be used while still supporting reasonable signal to interference and noise ratio (SINR).

Figure 5A:
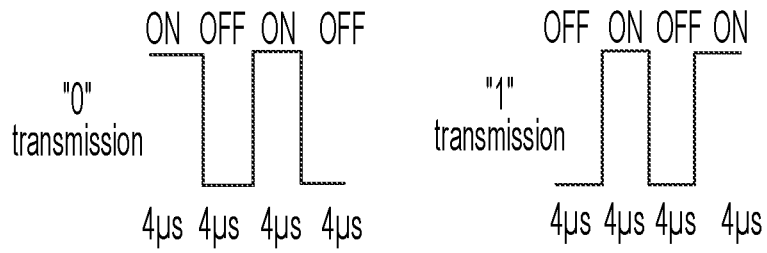
FIG. 5A illustrates an example of WUR symbol structures.
Figure 5B:
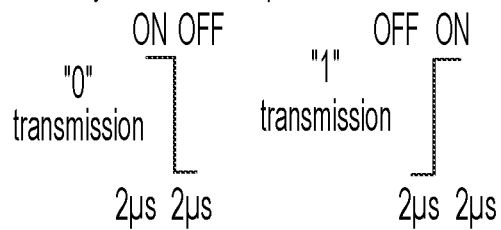
FIG. 5B illustrates another example of WUR symbol structures.

FIGS. 5A and 5B illustrate examples of WUR symbol structures with various data rates. FIG. 5A shows a WUR symbol structure for 62.5 kbps and FIG. 5B shows a WUR symbol structure for 250 kbps. The SYNC field may a narrowband preamble to support synchronization, frame detection, and rate indication. Two different SYNC durations (64 μs or 128 μs) may be employed depending on the bit rate used in the data field (250 kbps or 62.5 kbps). SYNC field bit sequences may be selected to achieve a reduced frame error rate (FER). Multi-carrier (MC)-OOK modulation with Manchester coding may be employed for the data field symbols, which may provide on and off periods for both one and zero bit values. Symbol duration may depend on the bit rate and symbol structure may depend on whether a one or a zero bit value is being transmitted. For 62.5 kbps, a 16 μs long symbol may be employed with four differentiated sub-parts of 4 μs each alternating on and off periods and following a different schedule for transmissions of one and zero bits. For 250 kbps, symbol duration may be 4 μs with two sub-parts of 2 μs each and alternating the on and off periods differently for transmissions of one and zero bits.

Based on the WUR characteristics in FIG. 3, WUS may have a shorter coverage than a regular NR cell and correspondingly on the network level, WUS coverage may not be as continuous as NR network coverage. When the UE is in WUS/WUR mode, it may be desirable for the UE to be aware of whether the UE remains within WUS coverage, despite possible movement by the UE. When the UE determines that it has exited WUS coverage, UE may take actions such as, for example, activating regular NR idle mode to check whether the UE is within NR coverage. Because one goal of the WUS/WUR mode may be to save battery life of the UE by using WUR and using the NR transceiver in sleep or OFF state, it may be desirable for the UE to obtain and maintain awareness of being within WUS coverage with low energy consumption.

As an exemplary process, the WUR mode may be limited to static situations for the UE. In this example process, if the UE detects acceleration, the UE may terminate the WUR mode and, for example, activate a 5G idle mode. However, a problem with this example process is that the WUR mode and the benefits to UE battery consumption and paging latency may be limited to only static situations and may require cooperation between the NR transceiver and an acceleration detector/sensor.

As another exemplary process, the UE may use regular or modified NR mobility measurements to estimate when the UE has exited WUS coverage. However, this exemplary process may require that the UE regularly turns on the NR transceiver, which reduces any savings in the UE battery consumption by the regular use of NR transceiver.

As another exemplary process, a gNB may transmit a synchronization signal or a beacon on which UE performs strength measurement with WUR. However, WUR with very low power consumption may use a comparator without an analog-to-digital converter (ADC). The comparator may mask changes in the signal strength, and the UE either receives the beacon or not. When the UE moves outside WUS coverage, the UE may not detect the reducing strength of the beacon until the UE fails to detect the WUS beacon and a possible WUS. A problem with this exemplary process may be to delay the UE for determining that the UE cannot detect the sparsely sent beacon and to turn on and synchronize NR transceiver. During the delay time, the UE may fail to receive or miss the WUS signal intended for the UE and may require additional processes.

Various exemplary embodiments may provide advantages to resolve the deficiencies in the technology, such as the issues discussed above. For example, certain exemplary embodiments may advantageously provide one or more procedures for a WUS beacon arrangement that may provide a UE with a capability to determine earlier that the UE is on the proximity of a WUS coverage edge and if desirable, turn on an NR transceiver. The one or more procedures may also provide the UE with the capability to determine that the UE has entered and/or reentered the WUS coverage area and may enter a WUS mode and turn off the NR transceiver.

According to various exemplary embodiments, at least part of WUS beacon transmissions may be transmitted with lower power than the actual/complete WUS. The WUS beacon transmission may have a smaller coverage area and may provide the UE with the capability to detect a proximity of the UE to an edge of the coverage area. As an example, a beacon transmitter (beacon Tx) power may be smaller than a Tx power for the actual/complete WUS or default WUS beacon. As another example, the beacon Tx energy may be smaller than the Tx energy for the actual WUS or default WUS beacon. The WUS beacon may have a reduced energy that occupies less symbols or less subcarriers than the default beacon. For example, the reduced energy WUS beacon may use a subset of the symbols used for default WUS beacon.

In some exemplary embodiments, the WUS beacon may have a time pattern of default beacons and reduced power beacons. An exemplary time pattern may include beacons of multiple (e.g., more than two) different power levels. The reduced power WUS beacons may have lower transmission frequency (longer periodicity) than default beacons.

The UE may determine a relative location of the UE with respect to a WUS coverage edge based on a metric depending on detection of reduced power beacons. Further, the UE may determine whether the UE can reliably detect a possible wake-up signal. This may be whether a wake-up signal is detectable based on a metric depending on detection of reduced power beacons. According to various exemplary embodiments, there may be one or more metrics. An exemplary metric (M1) may be a ratio between detected number of reduced power WUS beacons and an expected number of reduced power WUS beacons in a defined window or a number of detected reduced power WUS beacons in the defined window (M1'). Another exemplary metric (M2) may be a ratio between the detected reduced power WUS beacons and the detected normal/default WUS beacons in a defined window or a difference between the number of detected reduced power WUS beacons and normal/default WUS beacons in the defined window (M2').

A further exemplary metric (M3) may be a number of consecutive successfully detected reduced power WUS beacons. Another exemplary metric (M4) may be a counter that has a set threshold value. The counter may be, for example, increased or decreased (e.g., by one or two etc.) when the reduced power WUS beacon is received or not received when expected. Another exemplary metric (M5) may be successful detection (e.g., one time) of the reduced power WUS beacon or failure to detect (one time) the reduced power WUS beacon when expected.

According to some exemplary embodiments, a beacon functionality and/or metric may be embedded to an actual signal design of the WUS or WUS beacon so that the signal design includes, for example, two segments which are differentiated so that the segments result in different detection probabilities. A different power level may be used in the transmitter, for example, to different parts of the sequence, when the beacon Tx power may be smaller than the Tx power for the actual WUS or default WUS beacon. When the beacon Tx energy is smaller than the Tx energy for the actual WUS or default WUS beacon, the different lengths/sequence may be used in different parts of the signal. A total combined or concatenated sequence may be used to determine the correct detection of the signal, while partial detection of the segments/parts may be used in the determination of the metric.

Based on the determined value of the metric, a movement direction of the UE may be used to select an exemplary process for controlling the mode of the UE. According to certain exemplary embodiments, the UE may be moving away from a base station or gNB and the UE may fail to detect a significant portion of reduced power WUS beacons. The metric may be selected from M1-M5 discussed herein, which may have a value below certain value. For example, for metric M1, the ratio may be below a predetermined value/threshold or a configured value. The UE may switch to an NR mode, or may switch an NR receiver to "ON," which is a sleep state. The UE may remain in WUS mode and may prepare to switch to a PDCCH monitoring once the UE does not detect any reduced power WUS beacon, which may be a coverage-indicating beacon, in a time window. As an example, the time window may be an absolute time window or a number "x" of last (most recent) occurrences/periods of the beacon. The exemplary embodiments may reduce the transition time from WUS mode to NR mode.

According to certain exemplary embodiments, the UE may modify the metric for switching to NR mode to an aggressive setting, or the UE may increase a monitoring frequency of the WUS beacon, when the UE is not static. The aggressive setting may be a failure to detect single WUS beacons, which triggers switching to the NR mode.

According to various exemplary embodiments, the UE may be moving towards the base station or gNB and the UE may detect a reduced power WUS beacon. The metric may be selected from M1-M5 and may be above a certain value. For example, for metric M1, the ratio may be above a predetermined value/threshold or configured value. The UE may switch from the NR mode to the WUS mode, or the UE may switch from NR Idle to a WUS monitoring mode based on the detection of the default WUS beacon. The UE may continue to keep the NR receiver in the "ON" state in a sleep state until the UE detects the reduced power WUS beacon, which may be a coverage-indicating beacon, in a time window. The exemplary embodiments may reduce the possible fallback transition time from WUS mode to NR mode.

According to some exemplary embodiments, the UE may modify the metric for switching to NR mode to a conservative setting, or may reduce the frequency of WUS beacon monitoring, if possible by other metrics. The conservation setting may be an NR radio that may be turned on when the UE has failed to detect K WUS beacons out of N beacons.

Figure 6:
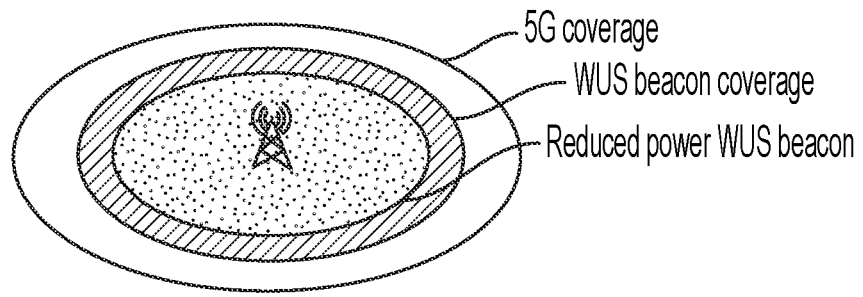
FIG. 6 illustrates a schematic representation of a 5G/NR coverage, WUS/WUS beacon coverage, and reduced power WUS beacon coverage, according to various exemplary embodiments.

FIG. 6 illustrates an example of a schematic representation of a 5G/NR coverage, WUS/WUS beacon coverage, and reduced power WUS beacon coverage, according to various exemplary embodiments. FIG. 6 shows a relation between the coverages of NR, WUS/default WUS beacon, and reduced power WUS beacon. The relation of the coverage of reduced power WUS beacons may be designed to be smaller than the coverage of default (or normal power) WUS beacon and WUS, which may provide the UE with the indication of WUS coverage edge proximity. Although FIG. 6 illustrates an example with omnidirectional transmission, the exemplary embodiments are not limited to omnidirectional transmission. Other types of transmission may also be used, such as, for example, sectorized transmission or pseudo-omnidirectional transmission with concurrent transmission on all sectors in the cell.

Figure 7A:
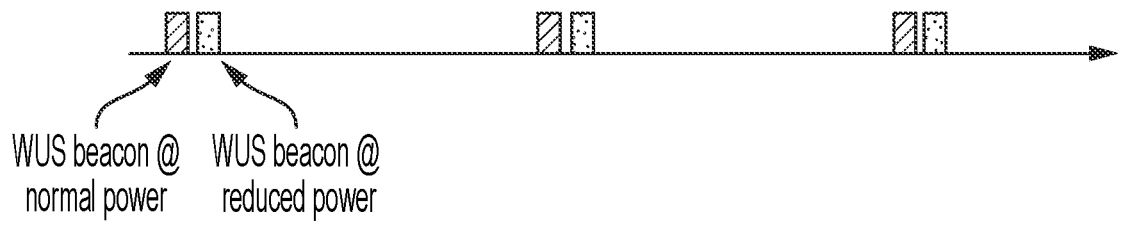
FIG. 7A illustrates an example of a WUS beacon time pattern, according to various exemplary embodiments.
Figure 7B:
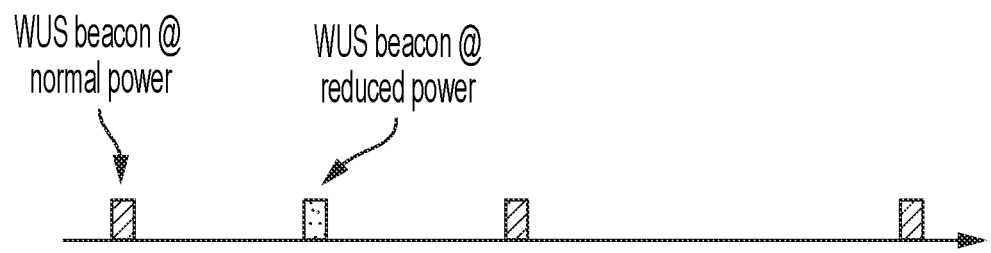
FIG. 7B illustrates another example of a WUS beacon time pattern, according to some exemplary embodiments.
Figure 7C:
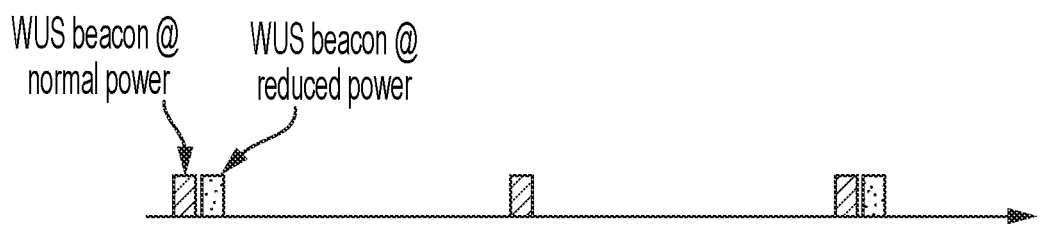
FIG. 7C illustrates a further example of a WUS beacon time pattern, according to some exemplary embodiments.

FIGS. 7A-7C illustrate various examples of different WUS beacon time patterns, according to various exemplary embodiments. FIG. 7A shows a reduced power WUS beacon that may have a predefined time relation or time difference to a normal/default WUS beacon. The UE may be able to predict a reduced power WUS beacon based on the detected normal/default WUS beacon.

FIG. 7B shows an example in which the reduced power WUS and the normal/default WUS beacon have predetermined time instances based on which the UE learns/determines when to expect beacons. Periodicities for the reduced power WUS beacon and normal/default WUS beacon may be different, such as, for example, the periodicity for reduced power WUS beacon may be twice the periodicity of normal/default WUS beacon. FIG. 7C shows another example of FIG. 7B in which a time offset between the reduced power WUS beacon pattern and the normal/default WUS beacon pattern is different.

Certain exemplary embodiments may provide that a channel fading may not change between the reduced power WUS beacon and normal/default WUS beacon. Both of the reduced power WUS beacon and normal/default WUS beacon may use the same frequency resources or at least frequency resources close to each other when compared to an expected channel coherence bandwidth. A time difference between the reduced power WUS beacon and normal/default WUS beacon may be relatively short when compared to the expected channel coherence time. The time difference that the network configures between the reduced power WUS beacon and normal/default WUS beacon may be impacted by speeds of the UE for which WUS mode may be reliably supported.

In some exemplary embodiments, the UE may monitor for the WUS beacon in addition to an actual WUS that would trigger the switching to NR mode. A WUS mode configuration may contain configuration of time/frequency resources, sequence(s), time patterns(s) for normal WUS beacon, reduced power WUS beacon, and actual WUS. The WUS mode configuration may also contain a configuration of parameters related to the determination of WUS coverage edge proximity, such as a threshold value for ratio and time period or a number of WUS beacons used in the ratio determination.

Figure 8:
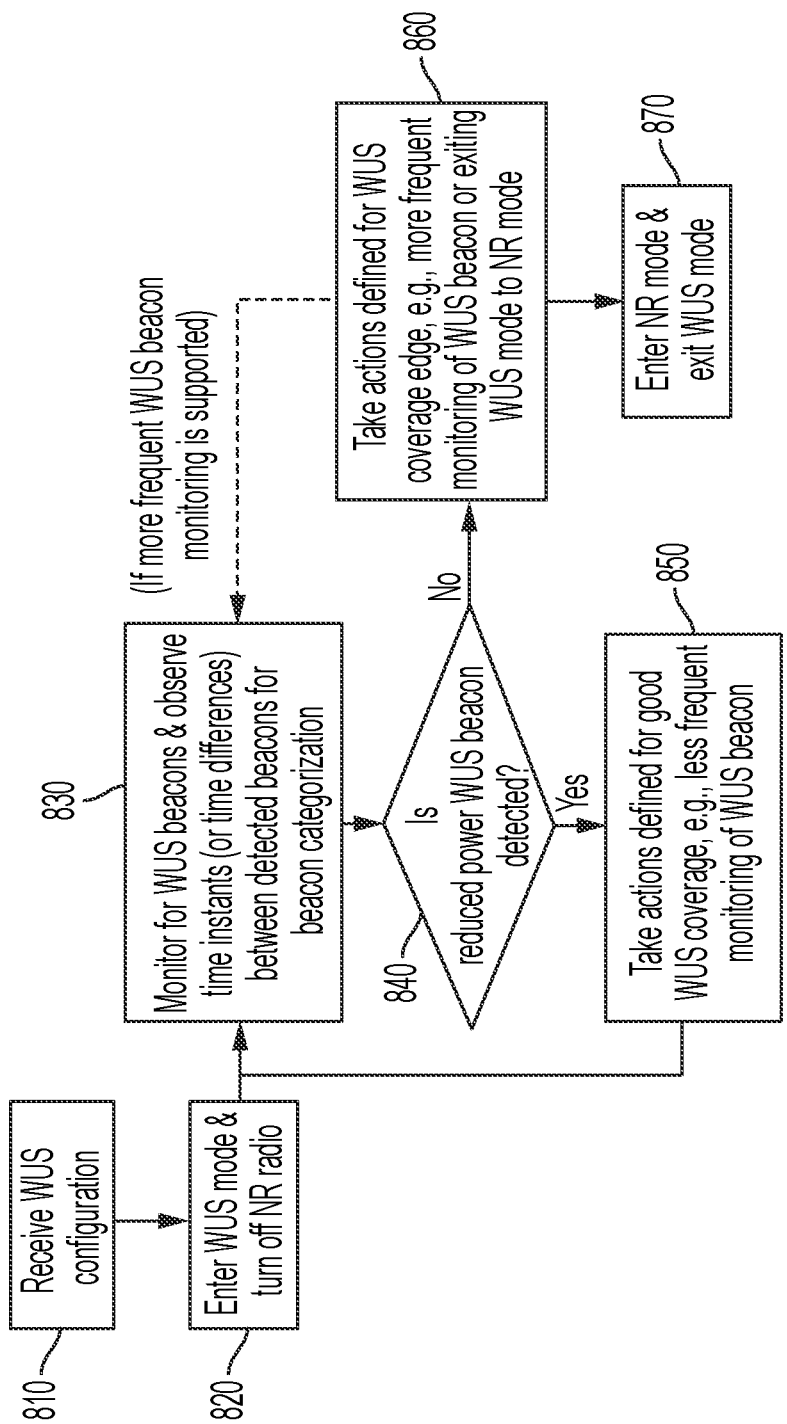
FIG. 8 illustrates an example of a flowchart of procedures performed by a UE, according to certain exemplary embodiments.

FIG. 8 illustrates an example of a flowchart of procedures performed by a UE, according to certain exemplary embodiments. In FIG. 8, the UE may determine which beacons have normal power and which have reduced power based on beacon time instants or beacon time differences. At 810, the UE may receive a WUS configuration, and at 820, the UE may enter a WUS mode and turn OFF the NR radio/transceiver. At 830, the UE may monitor WUS beacons and monitor/observe time instants or time differences between detected beacons for beacon categorization. At 840, the UE may determine whether a reduced power WUS beacon is detected based on, for example, a comparison of a detection metric against a threshold. If YES (reduced power beacon detected), the procedure may continue to 850. At 850, the UE may perform processes/actions defined for sufficient (e.g., good) WUS coverage, such as less frequent monitoring of the WUS beacon. The procedure may then return to 830.

At 840, if the UE determines that a reduced power WUS beacon is not detected (NO decision), the procedure may continue to 860. At 860, the UE may perform processes/actions defined for a WUS coverage edge, such as more frequent monitoring of the WUS beacon or exiting a WUS mode to an NR mode. When a relatively more frequent WUS beacon monitoring mode is supported or activated, the procedure may return to 830. When the relatively more frequent WUS beacon monitoring mode is not supported, the procedure may continue to 870. At 870, the UE may enter an NR mode and may exit a WUS mode.

Figure 9:
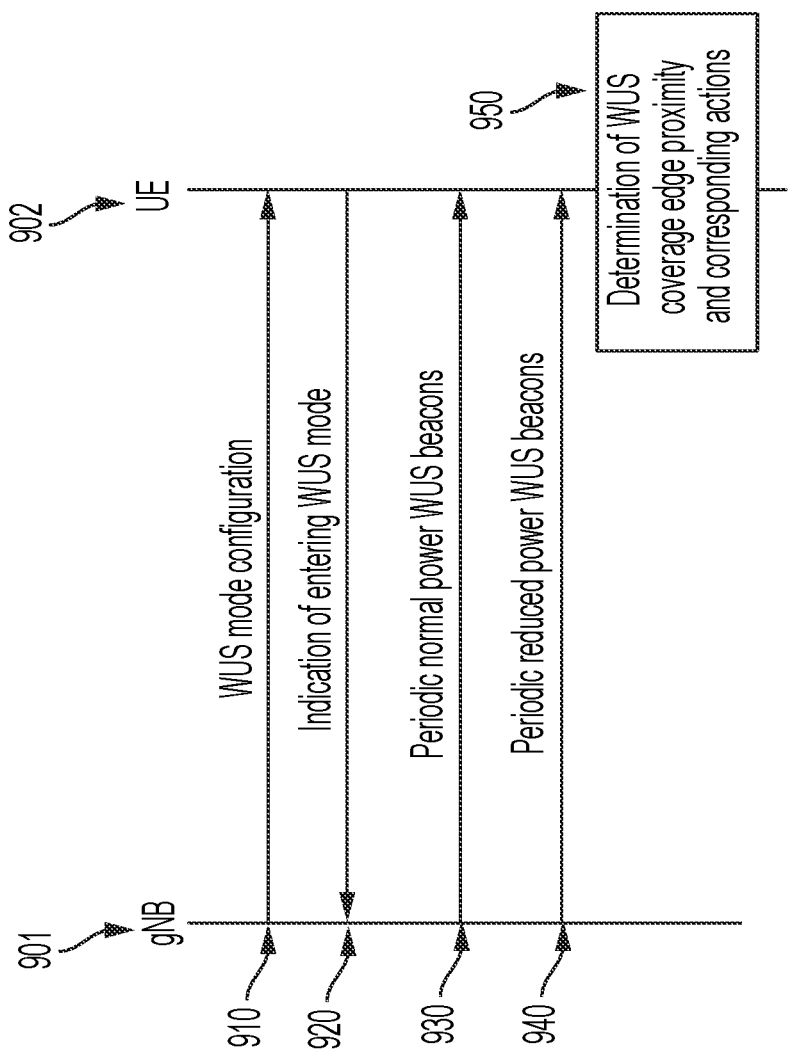
FIG. 9 illustrates an example of a signal diagram for an exemplary procedure, according to various exemplary embodiments.

FIG. 9 illustrates an example of a signal diagram for an exemplary procedure performed by a UE 902, according to various exemplary embodiments. At 910, a gNB 901 may prepare and transmit a WUS mode configuration to the UE 902. At 920, the UE 902 may provide, to the gNB 901, an indication of the UE 902 entering the WUS mode. At 930, the gNB 901 may provide a periodic normal power WUS beacon to the UE 902, and at 940, the gNB 901 may provide periodic reduced power WUS beacons to the UE 902. At 950, the UE 902 may determine a WUS coverage edge proximity and may select/determine corresponding processes to determine whether to switch between NR mode and/or WUS mode.

According to various exemplary embodiments, the network may provide, to the UE, a WUS configuration that may include at least two different types of WUS beacons. In some exemplary embodiments, the at least two types of WUS beacons may include at least a type 1 beacon, which is the regular/default beacon, and at least a type 2 beacon, which is an additional beacon that may be transmitted with a lower power level than the type 1 beacon for assisting the UE with WUS coverage edge detection.

According to some exemplary embodiments, for example, the type 2 beacon may be configured with a larger periodicity than the type 1 beacon. As another example, the time/frequency resources to be used for reception of a type 2 beacon may be configured relative to the time/frequency resources of the type 1 beacon. As another example, the network may configure type 1 and type 2 beacons associated to the same sequence and with a different sequence length, where the type 2 beacon has a shorter length than the type 1 beacon.

Further, in certain exemplary embodiments, for example, a difference or change amount (e.g., delta) in transmit power between the type 2 beacon and the type 1 beacon may be indicated to the UE. The UE may use the indicated difference/change amount (delta) information to determine and/or adjust when to switch to NR mode. In another example, the network may configure the type 2 beacon on a per beam basis. For example, the type 2 beacon may be configured in the outer beams. As a further example, the network may set a power difference between the type 1 beacon and the type 2 beacon by taking into account the radio environment, such as time coherence and fading properties, and the delay it may take for the UE to switch from a WUS monitoring mode to a PDCCH monitoring mode. The amount of power reduction may be limited to avoid a too large power reduction, which may limit the area in which the UE may use WUS.

As an additional example, according to some exemplary embodiments, the WUS configuration may also include one or more thresholds for the WUS coverage-edge detection metrics associated with the type 2 beacon, such as metrics M1-M5. Another example may be the threshold values may differ for different types of UEs, such as for UEs that are static.

Figure 10:
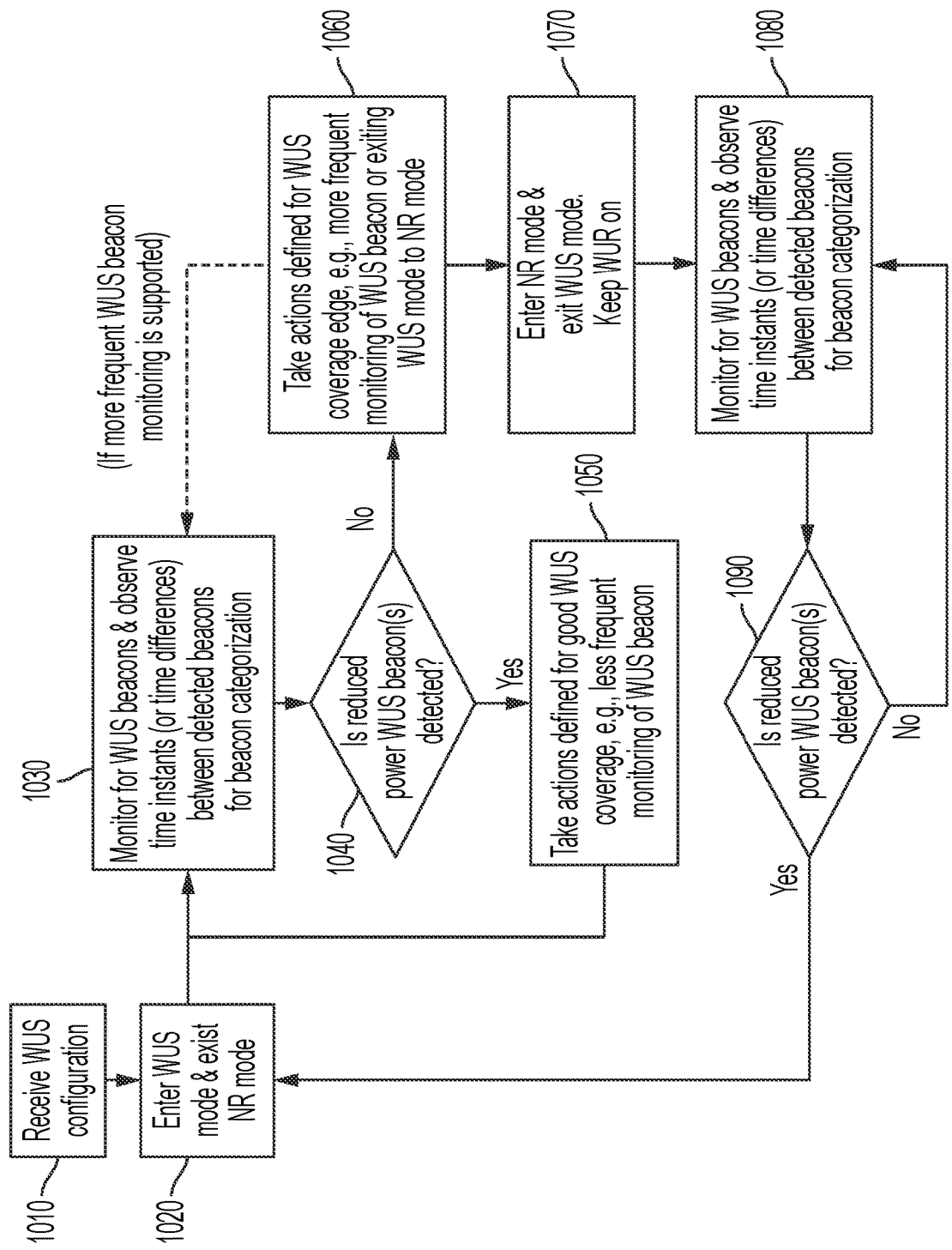
FIG. 10 illustrates an example of a flowchart of one or more procedures where a UE may enter/reenter a WUS mode, according to certain exemplary embodiments.

FIG. 10 illustrates an example of a flowchart of one or more procedures performed by, for example, a UE, where the UE may enter/reenter a WUS mode based on WUS beacon detection, according to various exemplary embodiments. The UE may switch back to WUS mode when the WUS beacons with reduced power may be received, such as a metric Mx is fulfilled. In this example, it may be assumed that the UE may have received a WUS mode configuration and entered WUS mode, after which it has moved outside WUS coverage and switched to NR mode while continuing to monitor WUS beacons. When a good reception of WUS beacons with reduced power has occurred, the UE may determine that the UE has moved back to a WUS coverage area and may re-enter a WUS mode.

In FIG. 10, at 1010, the UE may receive a WUS configuration, and at 1020, the UE may enter a WUS mode and exit an NR mode. At 1030, the UE may monitor for WUS beacons and observe time instants, or time differences, between detected beacons for beacon categorization. At 1040, the UE may determine whether one or more reduced power WUS beacons have been detected based on, for example, a comparison between a detection metric and a threshold. If YES, the procedure may continue to 1050, at which the UE may perform processes/actions defined for sufficient (e.g., good) WUS coverage, such as, for example, less (reduced) frequent monitoring of WUS beacons. If NO (i.e., reduced power WUS beacons have not been detected), the process may continue to 1060. At 1060, the UE may perform processes/actions defined for WUS coverage edge, such as, for example, more frequent (increased) monitoring of WUS beacons or exiting the WUS mode and transitioning to an NR mode. If the UE increases the monitoring of the WUS beacons, the procedure may return to 1030. If the UE exits the WUS mode, at 1070, the UE may transition to the NR mode while keeping the WUR turned ON.

At 1080, the UE may monitor for WUS beacons and observe time instants or time differences between one or more detected beacons for beacon categorization. At 1090, the UE may determine again whether one or more reduced power WUS beacons have been detected. If YES, the procedure may return to 1020, and if NO (i.e., reduced power WUS beacons have not been detected), the process may return to 1080.

Figure 11:
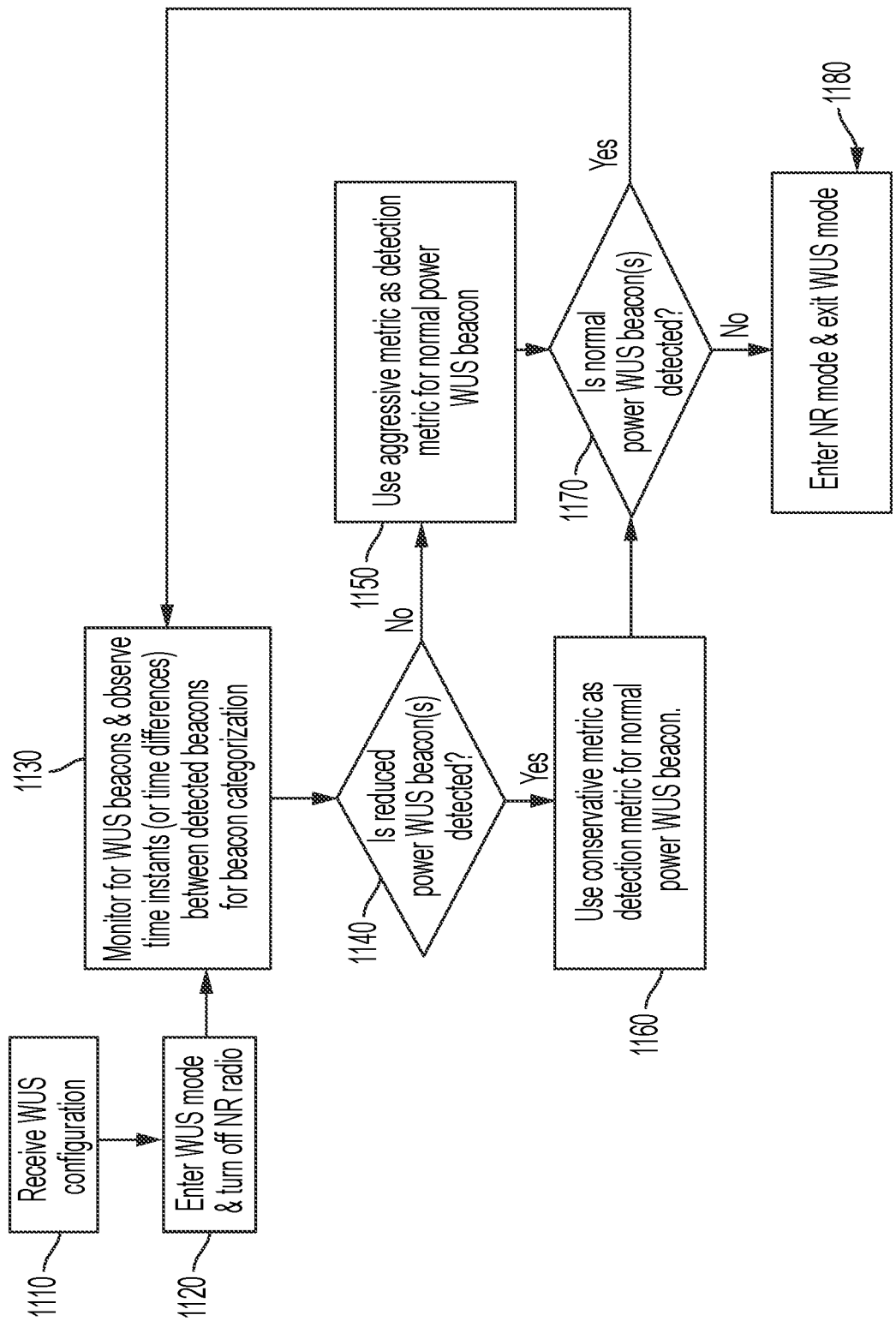
FIG. 11 illustrates an example of a flow chart for a procedure by a UE using an NR mode selection metric, according to various exemplary embodiments.

FIG. 11 illustrates an example of a flow chart for a procedure by a UE in which an NR mode selection metric may be adjusted by the UE based on detection of a reduced power WUS beacon, accordingly to various exemplary embodiments. The UE may modify the metric (criterion) for switching to NR mode to an aggressive setting or return to more conservative setting, depending on the detection of reduced power WUS beacons. In an attempt to avoid reduction in WUS coverage, the switching of the UE to NR mode may be determined based on a detection metric (criterion) of a WUS beacon with normal power. To attempt to avoid a lengthy latency in the detection of WUS coverage loss, the UE may use a metric that is aggressive on a WUS coverage edge, such as, for example, a failure to detect single WUS beacons triggers switching to NR mode. Because an aggressive metric may increase a false alarm rate, which in turn increases battery consumption, when the UE may not be on the WUS coverage edge, the UE may use a relatively more conservative metric. For example, the more conservative metric may be that the NR radio is turned ON when the UE has failed to detect K WUS beacons out of N beacons. The selection between aggressive and conservative metric may be based on the detection of WUS beacon with reduced power.

As illustrated in FIG. 11, at 1110, the UE may receive a WUS configuration, and at 1120, the UE may enter a WUS mode and turn OFF the NR radio. At 1130, the UE may monitor for WUS beacons and observe time instants, or time differences, between detected beacons for beacon categorization. At 1140, the UE may determine whether one or more reduced power WUS beacons have been detected. If NO, the procedure may continue to 1150, at which the UE may use, or switch to using, an aggressive metric as a detection metric for a normal power WUS beacon. If YES, the procedure may continue to 1160, at which the UE may use, or switch to using, a conservative metric as a detection metric for a normal power WUS beacon.

At 1170, the UE may again determine whether one or more reduced power WUS beacons have been detected. If YES, the procedure may return to 1130, and if NO (i.e., reduced power WUS beacons have not been detected), the process may continue to 1180. At 1180, the UE may enter the NR mode and exit the WUS mode.

Figure 12:
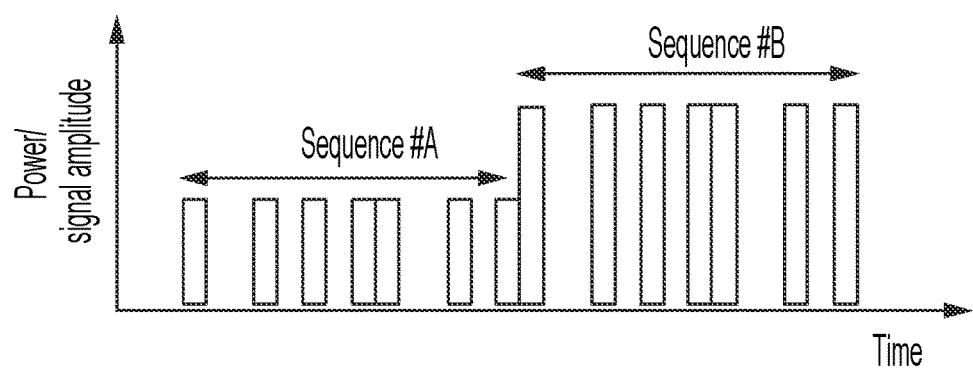
FIG. 12 illustrates an example of a representation of power/signal amplitude change over time, according to some exemplary embodiments.

FIG. 12 illustrates an example of a power/signal amplitude change over time for a multi-level signal design for coverage level detection, according to various exemplary embodiments. In the example shown in FIG. 12, an On-Off key (OOK) sequence #A may be transmitted twice in a concatenated manner (Seq. #A+Seq. #A) with different amplitudes that may be used in the OOK sequence 'ON' symbols. In some exemplary embodiments, when detecting the signal, a receiver/detector may change the signal structure by combining the repetitions, such as, for example, combining the detected envelopes before comparing to the threshold to determine the presence of the signal, and perform a detection based on one repetition of the sequence.

Figure 13:
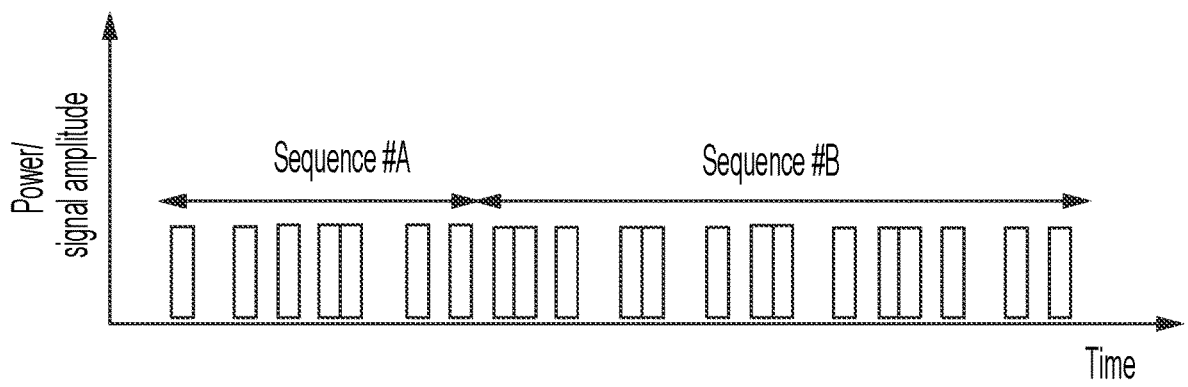
FIG. 13 illustrates another example of a representation of power/signal amplitude change over time, according to certain exemplary embodiments.

FIG. 13 illustrates an example of a power/signal amplitude change over time for a concatenated multi-sequence, according to certain exemplary embodiments. For example, the multi-sequence design may include two concatenated sequences with different lengths. During signal detection, the receiver may attempt to detect a total concatenated OOK sequence to determine the presence of the signal and detect the separate portions of the OOK sequence as beacons with reduced power.

In some exemplary embodiments for a receiver implementation/signal design, a receiver may determine a pseudo-error rate by individually deciding for each symbol in a set of (e.g., Manchester coded) symbols whether the symbol was correctly detected as compared to a symbol in an assumed reference sequence. For example, a longer or higher power sequence may be sent or detected first so that a signal presence may be confirmed first in a reliable manner. Subsequently, a shorter, or lower power, post-preamble may be used to determine a pseudo-error rate to establish a metric, such as for a coverage criterion.

According to certain exemplary embodiments, the UE may monitor for actual WUS that may trigger the switching to NR mode in addition to the WUS beacon. The UE may distinguish the WUS beacon and the actual WUS for waking up the UE by the wake up signal structure (e.g. by a sequence of on-off keyed symbols) or by frequency and/or time resources used by the WUS and WUS beacons.

According to some exemplary embodiments, a ratio may be determined based on detection of multiple consecutive beacons or the ratio may be based on single detection of beacons.

Figure 14:
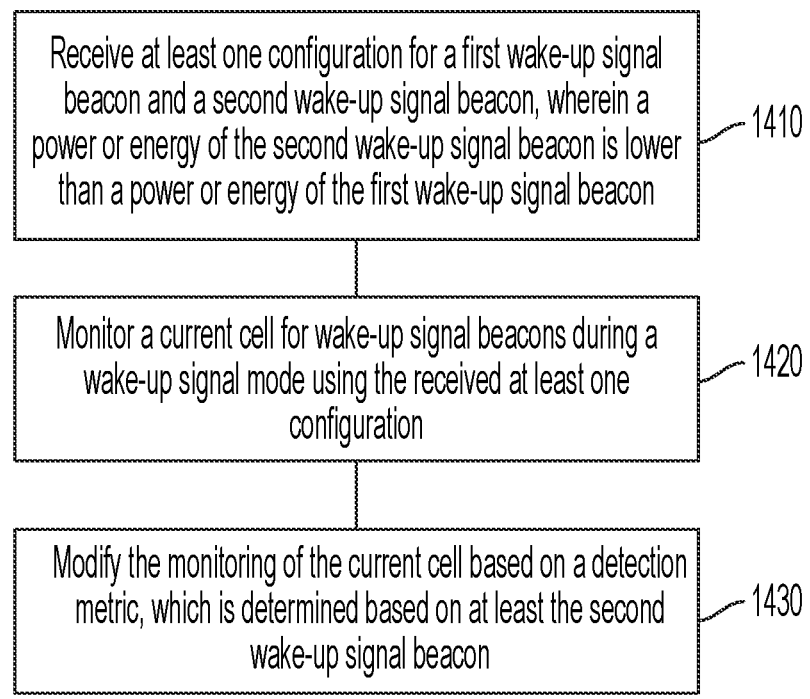
FIG. 14 illustrates an example of a flow diagram of a method, according to certain exemplary embodiments.

FIG. 14 illustrates an example flow diagram of a method, according to certain exemplary embodiments. In an example embodiment, the method of FIG. 14 may be performed by a network element, or a group of multiple network elements in a 3GPP system, such as LTE or 5G-NR. For instance, in an exemplary embodiment, the method of FIG. 14 may be performed by a user equipment, user device, or mobile device connected to the network, such as a UE similar to apparatus 1610 illustrated in FIG. 16.

According to various exemplary embodiments, the method of FIG. 14 may include, at 1410, receiving at least one configuration for a first wake-up signal beacon and a second wake-up signal beacon. A power or energy of the second wake-up signal beacon may be lower than a power or energy of the first wake-up signal beacon. The method may further include, at 1420, monitoring a current cell for wake-up signal beacons during a wake-up signal mode using the received at least one configuration. The method may further include, at 1430, modifying the monitoring of the current cell based on a detection metric. The detection metric may be determined based on at least the second wake-up signal beacon.

Figure 15:
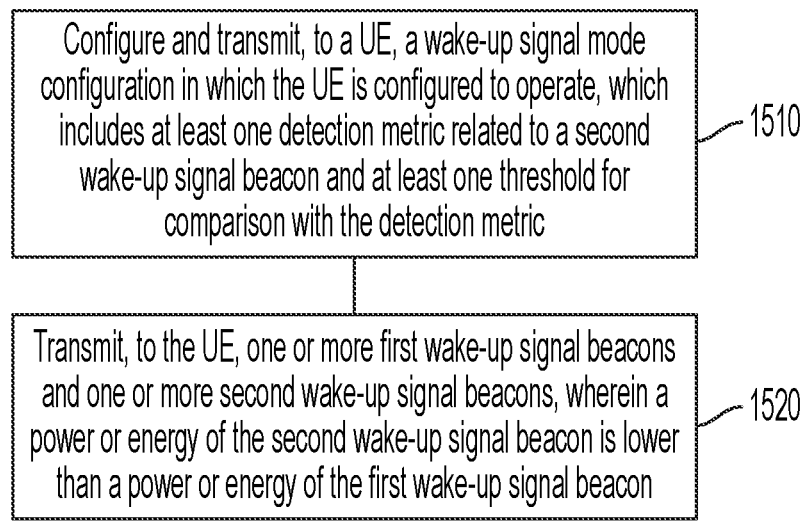
FIG. 15 illustrates an example of a flow diagram of another method, according to certain exemplary embodiments.

FIG. 15 illustrates an example flow diagram of a method, according to certain exemplary embodiments. In an example embodiment, the method of FIG. 15 may be performed by a network element, or a group of multiple network elements in a 3GPP system, such as LTE or 5G-NR. For instance, in an exemplary embodiment, the method of FIG. 15 may be performed by a network or network entity, such as a base station or gNB, similar to apparatus 1620 illustrated in FIG. 16.

According to various exemplary embodiments, the method of FIG. 15 may include, at 1510, configuring and transmitting, to a UE 1610, a wake-up signal mode configuration in which the UE 1610 may be configured to operate, which may include at least one detection metric related to a second wake-up signal beacon and at least one threshold for comparison with the detection metric. The method may further include, at 1520, transmit, to the UE 1610, one or more first wake-up signal beacons and one or more second wake-up signal beacons. A power or energy of the second wake-up signal beacon may be lower than a power or energy of the first wake-up signal beacons.

Figure 16:
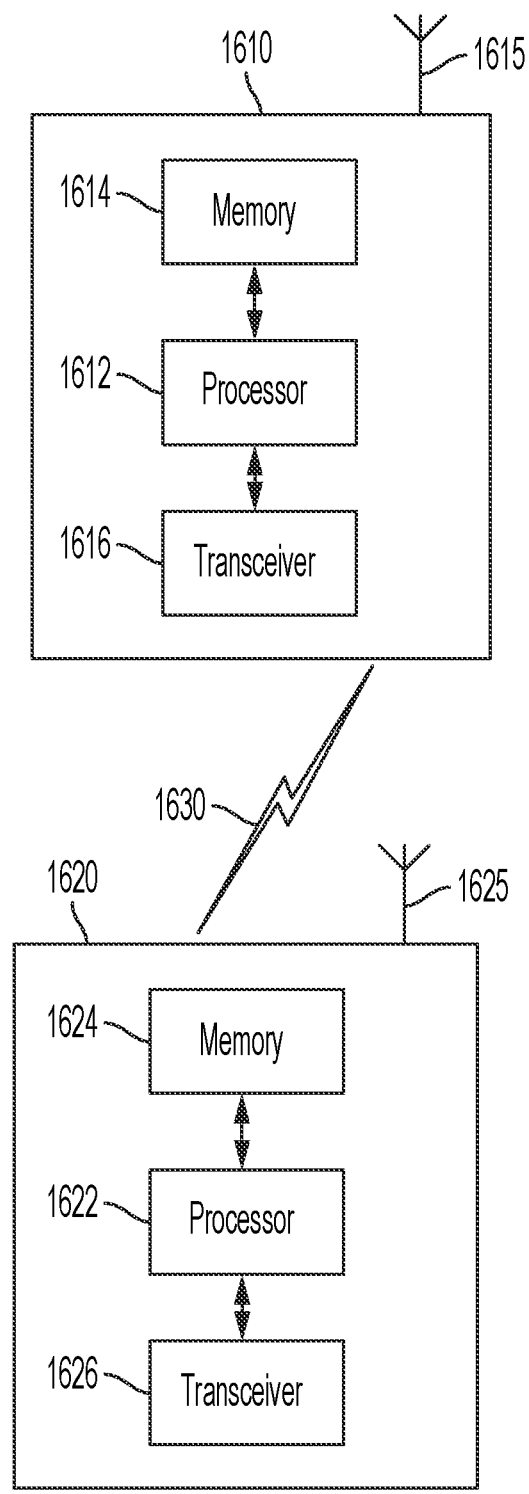
FIG. 16 illustrates a set of apparatuses, according to various exemplary embodiments.

FIG. 16 illustrates a set of apparatuses 1610 and 1620 according to various exemplary embodiments. In the various exemplary embodiments, the apparatus 1610 may be an element in a communications network or associated with such a network, such as a UE, RedCap UE, SL UE, mobile equipment (ME), mobile station, mobile device, stationary device, IoT device, or other device. For example, the UE 902 according to various exemplary embodiments discussed above may be an example of apparatus 1610. It should be noted that one of ordinary skill in the art would understand that apparatus 1610 may include components or features not shown in FIG. 16. In addition, apparatus 1620 may be a network, network entity, element of the core network, or element in a communications network or associated with such a network, such as a base station, an NE, or a gNB. For example, the gNB 901 according to various exemplary embodiments as discussed above may be an example of apparatus 1620. It should be noted that one of ordinary skill in the art would understand that apparatus 1620 may include components or features not shown in FIG. 16. It should be noted that one of ordinary skill in the art would understand that apparatus 1620 may include components or features not shown in FIG. 16.

According to various exemplary embodiments, the apparatus 1610 may include at least one processor, and at least one memory, as shown in FIG. 16. The memory may store instructions that, when executed by the processor, cause the apparatus 1610 to receive at least one configuration for a first wake-up signal beacon and a second wake-up signal beacon. A power or energy of the second wake-up signal beacon may be lower than a power or energy of the first wake-up signal beacon. The apparatus may also be caused to monitor a current cell for wake-up signal beacons during a wake-up signal mode using the received at least one configuration, and modify the monitoring of the current cell based on a detection metric, wherein the detection metric is determined based on at least the second wake-up signal beacon.

According to various exemplary embodiments, the apparatus 1620 may include at least one processor, and at least one memory, as shown in FIG. 16. The memory may store instructions that, when executed by the processor, cause the apparatus 1620 to configure and transmit, to a user equipment, a wake-up signal mode configuration in which the user equipment is configured to operate, which includes at least one detection metric related to a second wake-up signal beacon and at least one threshold for comparison with the detection metric. The apparatus may also be caused to transmit, to the user equipment, one or more first wake-up signal beacons and one or more second wake-up signal beacons. A power or energy of the second wake-up signal beacon may be lower than a power or energy of the first wake-up signal beacon.

Various exemplary embodiments described above may provide several technical improvements, enhancements, and/or advantages. For instance, some exemplary embodiments may provide advantages of one or more procedures to provide less complex (simpler) WURs without ADC or other functionality for signal strength measurement. The various exemplary embodiments may allow the UE in WUS/WUR mode to detect when it is approaching the WUS coverage edge before UE falls outside or exits the WUS coverage with lower power consumption, which minimizes a risk that the UE may miss an actual WUS while being out of WUS coverage.

In some example embodiments, apparatuses 1610 and/or 1620 may include one or more processors, one or more computer-readable storage medium (for example, memory, storage, or the like), one or more radio access components (for example, a modem, a transceiver, or the like), and/or a user interface. In some example embodiments, apparatuses 1610 and/or 1620 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 16, apparatuses 1610 and/or 1620 may include or be coupled to processors 1612 and 1622, respectively, for processing information and executing instructions or operations. Processors 1612 and 1622 may be any type of general or specific purpose processor. In fact, processors 1612 and 1622 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 1612 (and 1622) for each of apparatuses 1610 and/or 1620 is shown in FIG. 16, multiple processors may be utilized according to other example embodiments. For example, it should be understood that, in certain example embodiments, apparatuses 1610 and/or 1620 may include two or more processors that may form a multiprocessor system (for example, in this case processors 1612 and 1622 may represent a multiprocessor) that may support multiprocessing. According to certain example embodiments, the multiprocessor system may be tightly coupled or loosely coupled to, for example, form a computer cluster).

Processors 1612 and 1622 may perform functions associated with the operation of apparatuses 1610 and/or 1620, respectively, including, as some examples, precoding of antenna gain/phase parameters, encoding and decoding of individual bits forming a communication message, formatting of information, and overall control of the apparatuses 1610 and/or 1620, including processes illustrated in FIGS. 8-11, 14, and 15.

Apparatuses 1610 and/or 1620 may further include or be coupled to memory 1614 and/or 1624 (internal or external), respectively, which may be coupled to processors 1612 and 1622, respectively, for storing information and instructions that may be executed by processors 1612 and 1622. Memory 1614 (and memory 1624) may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 1614 (and memory 1624) can be comprised of any combination of random access memory (RAM), read only memory (ROM), static storage such as a magnetic or optical disk, hard disk drive (HDD), or any other type of non-transitory machine or computer readable media. The instructions stored in memory 1614 and memory 1624 may include program instructions or computer program code that, when executed by processors 1612 and 1622, enable the apparatuses 1610 and/or 1620 to perform tasks as described herein.

In certain example embodiments, apparatuses 1610 and/or 1620 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 1612 and 1622 and/or apparatuses 1610 and/or 1620 to perform any of the methods illustrated in FIGS. 8-11, 14, and 15.

In some exemplary embodiments, apparatuses 1610 and/or 1620 may also include or be coupled to one or more antennas 1615 and 1625 for receiving a downlink signal and for transmitting via an uplink from apparatus 1610 and apparatus 1620, respectively. Apparatuses 1610 and/or 1620 may further include transceivers 1616 and 1626, respectively, configured to transmit and receive information. The transceiver 1616 and 1626 may also include a radio interface that may correspond to a plurality of radio access technologies including one or more of GSM, LTE, LTE-A, 5G, NR, WLAN, NB-IoT, Bluetooth, BT-LE, NFC, RFID, UWB, or the like. The radio interface may include other components, such as filters, converters (for example, digital-to-analog converters or the like), symbol demappers, signal shaping components, an Inverse Fast Fourier Transform (IFFT) module, or the like, to process symbols, such as OFDMA symbols, carried by a downlink or an uplink.

For instance, transceivers 1616 and 1626 may be respectively configured to modulate information on to a carrier waveform for transmission, and demodulate received information for further processing by other elements of apparatuses 1610 and/or 1620. In other example embodiments, transceivers 1616 and 1626 may be capable of transmitting and receiving signals or data directly. Additionally or alternatively, in some example embodiments, apparatuses 1610 and/or 1620 may include an input and/or output device (I/O device). In certain example embodiments, apparatuses 1610 and/or 1620 may further include a user interface, such as a graphical user interface or touchscreen.

In certain example embodiments, memory 1614 and memory 1624 store software modules that provide functionality when executed by processors 1612 and 1622, respectively. The modules may include, for example, an operating system that provides operating system functionality for apparatuses 1610 and/or 1620. The memory may also store one or more functional modules, such as an application or program, to provide additional functionality for apparatuses 1610 and/or 1620. The components of apparatuses 1610 and/or 1620 may be implemented in hardware, or as any suitable combination of hardware and software. According to certain example embodiments, apparatus 1610 may optionally be configured to communicate with apparatus 1620 via a wireless or wired communications link 1630 according to any radio access technology, such as NR.

According to certain example embodiments, processors 1612 and 1622, and memory 1614 and 1624 may be included in or may form a part of processing circuitry or control circuitry. In addition, in some example embodiments, transceivers 1616 and 1626 may be included in or may form a part of transceiving circuitry.

In some exemplary embodiments, an apparatus (e.g., apparatus 1610 and/or apparatus 1620) may include means for performing a method, a process, or any of the variants discussed herein. Examples of the means may include one or more processors, memory, controllers, transmitters, receivers, and/or computer program code for causing the performance of the operations.

Certain exemplary embodiments may be directed to an apparatus that includes means for receiving at least one configuration for a first wake-up signal beacon and a second wake-up signal beacon, wherein a power or energy of the second wake-up signal beacon may be lower than a power or energy of the first wake-up signal beacon. The apparatus may also include means for monitoring a current cell for wake-up signal beacons during a wake-up signal mode using the received at least one configuration, and means for modifying the monitoring of the current cell based on a detection metric, wherein the detection metric is determined based on at least the second wake-up signal beacon.

Other exemplary embodiments may be directed to an apparatus that includes means for configuring and transmitting, to a UE similar to apparatus 1610, a wake-up signal mode configuration in which the UE is configured to operate, which includes at least one detection metric related to a second wake-up signal beacon and at least one threshold for comparison with the detection metric. The apparatus may also include means for transmitting, to the UE, one or more first wake-up signal beacons and one or more second wake-up signal beacons, wherein a power or energy of the second wake-up signal beacon is lower than a power or energy of the first wake-up signal beacon.

As used herein, the term "circuitry" may refer to hardware-only circuitry implementations (for example, analog and/or digital circuitry), combinations of hardware circuits and software, combinations of analog and/or digital hardware circuits with software/firmware, any portions of hardware processor(s) with software, including digital signal processors, that work together to cause an apparatus (for example, apparatus 1610 and/or 1620) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accompanying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (for example, apparatuses 1610 and/or 1620), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
ADC Analog-to-Digital Converter
BPSK Binary Phase Shift Keying
DCI Downlink Control Information
DL Downlink
DRX Discontinuous Reception
eDRX Extended Discontinuous Reception
EMBB Enhanced Mobile Broadband gNB 5G or Next Generation NodeB
LNA Low Noise Amplifier
LTE Long Term Evolution
MAC Medium Access Control
MCS Modulation Coding Scheme
NR New Radio
OFDM Orthogonal Frequency Division Multiplexing
OOK On-Off Key
PDCCH Physical Downlink Control Channel
PDSCH Physical Downlink Shared Channel
PDU Protocol Data Unit
PUSCH Physical Uplink Shared Channel
RAN Radio Access Network
RedCap Reduced Capability
RF Radio Frequency
RRC Radio Resource Control
SINR Signal to Interference and Noise Ratio
SYNC Synchronization
UCI Uplink Control Information
UE User Equipment
UL Uplink
URLLC Ultra Reliable Low Latency Communication
WUR Wake-Up Receiver
WUS Wake-Up Signal

We claim:

1. An apparatus comprising:
at least one processor; and
at least one memory storing instructions that, when executed by the at least one processor, cause the apparatus at least to:
receive at least one configuration for a first wake-up signal beacon and a second wake-up signal beacon, wherein a power or energy of the second wake-up signal beacon is lower than a power or energy of the first wake-up signal beacon, and wherein the second wake-up signal beacon and the first wake-up signal beacon are configured with different characteristics comprising periodicity, time-frequency resources, sequence length, difference in transmit power, a type of beam, a power difference adjusted based on time coherence and fading, and a threshold of detection metric for determining a position of the user equipment relative to a coverage edge of the wake-up signal;
monitor a current cell for wake-up signal beacons during a wake-up signal mode using the received at least one configuration;
modify the monitoring of the current cell based on the detection metric,
wherein the detection metric is determined based on at least the second wake-up signal beacon,
wherein the detection metric includes:
a ratio between a detected number of second wake-up signal beacons and an expected number of second wake-up signal beacons in a defined time window,
a number of detected second wake-up signal beacons in a defined time window,
a difference between a number of detected second wake-up signal beacons and first wake-up signal beacons in a defined window,
a number of consecutive successfully detected second wake-up signal beacons, and
a value of a counter that changes based on a number of wake-up signal beacons detected or not detected,
wherein the modifying comprises adjusting a frequency of monitoring for the first wake-up signal beacon or terminating the wake-up signal mode and transitioning to an active mode based on the detection metric,
wherein when the received wake-up signal beacon is the second wake-up signal beacon, the monitoring of the current cell is modified to decrease the frequency of monitoring the current cell for wake-up signal beacons in the wake-up signal mode, and
wherein when the received wake-up signal beacon is not the second wake-up signal beacon, the monitoring of the current cell is modified by:
(i) increasing the frequency of monitoring the current cell for wake-up signal beacons during the wake-up signal mode when the increasing is supported at the apparatus, and
(ii) terminating the monitoring of the current cell and transitioning from the wake-up signal mode to the active mode, while keeping a WUR receiver activated, when the increasing is not supported at the apparatus; and
determine a position of the apparatus relative to a coverage edge of the wake-up signal based on a comparison of the detection metric with the threshold.

* * * * *